Patented June 20, 1939

2,162,960

UNITED STATES PATENT OFFICE 2,162,960

COLOR PRODUCING COMPOUND AND PROCESS FOR PRODUCING THE SAME

Eugene A. Markush, Jersey City, and Julius Miller, Newark, N. J., assignors to Pharma Chemical Corporation, New York, N. Y., a corporation of New York No Drawing. Application February 4, 1937, Serial No. 124,084

9 Claims. (Cl. 260—140)

Our invention relates to dye-producing compounds and processes for producing the same.

We have found that, by condensing two moles of an aromatic diazo compound, or one mole of an aromatic tetrazo compound, with one mole of an aromatic diaryl compound containing at least one solubilizing group in each aryl member, we produce stabilized bis-diazo-diamino compounds capable of being split by acid treatment into the original aromatic diazo compound and the original aromatic diaryl compound, allowing the combination of the diazo compound with a coupling component to form valuable dyes.

The general formula for the compounds of our invention is the following:

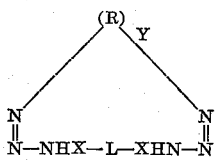

in which R is the residue of a diazotized member of the group consisting of aromatic monamines and aromatic diamines; X—L—X is a diaryl residue, the two aryl groups being directly connected to each other, in which case L becomes zero and X—L—X becomes X—X, or being connected to each other by a linkage member L; each aryl group containing at least one solubilizing group such as sulfo and carboxy and which may also contain other substitutions such as nitro, hydroxy, alkyl, alkoxy; the N=N group being combined directly with the N atom of the amino group of the diaryl compound; and in which Y is 2 when R is the residue of a diazotized aromatic amine and 1 when R is the residue of a tetrazotized aromatic amine.

L in the stated formula is a connecting link between the two aryl groups of such character that it is not disassociated when the diaryl compound is coupled with the azotized aromatic amine, and among which substitutions for L are

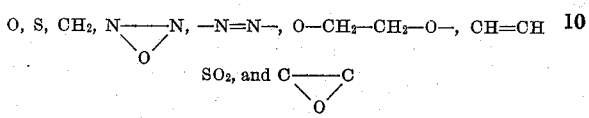

The following are formulae of some of our compounds illustrating various forms of L;

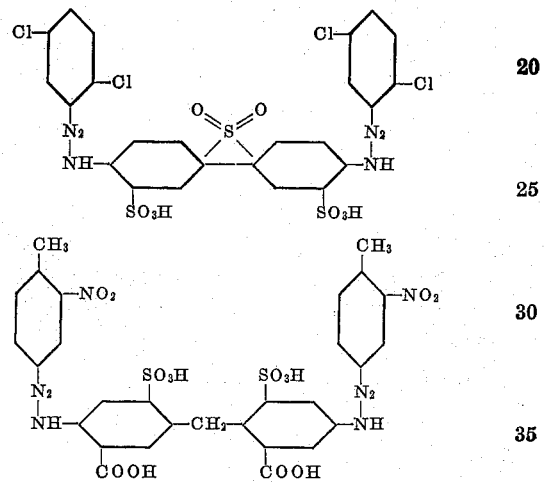

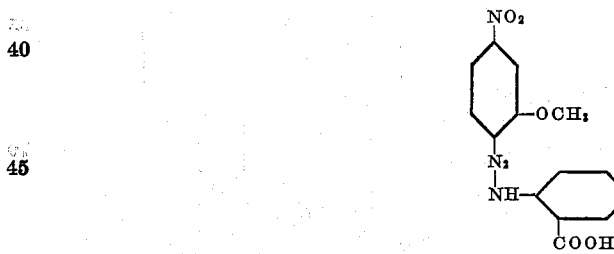

We give the following as examples of the production of some of the compounds of our invention:

Example I 237 parts of disulfo-dicarboxy-benzidine are dissolved in 2000 parts of water and sodium carbonate added in excess of the amount necessary to form the tetra sodium salt. About 400 parts are sufficient. To this solution is run in with good stirring the diazo solution prepared as follows:

152 parts of 5-nitro-2-amino-toluene M. P. 128–130° C. are dissolved in 700 parts water and 350 parts 20 Bé. muriatic acid at 95° C. The hot solution is dripped slowly with good stirring into 1500 parts of crushed ice. 70 parts sodium nitrite dissolved in 250 parts of water are then quickly added and stirring maintained until a clear diazo solution has resulted.

When all diazo has been added and consumed (indicated by a negative spot test with alkaline solution of 1-amino-8-naphthol-3-6 disulphonic acid) the precipitated bright orange deposit is filtered, pressed well, and dried. This compound when mixed with naphthols, especially arylides of beta-hydroxy naphthoic acid and applied on the fibre, will produce red and Bordeaux shades, when subjected to acid treatment.

Example II 162 parts of 2.5 dichlor-analine are suspended in 200 parts of water and heated until the crystals have melted. Under vigorous stirring, 464 parts of hydrochloride acid, 20° Bé., are added and the whole mass cooled to 5° C. by the addition of crushed ice.

70 parts of sodium nitrite in 300 parts of water are added and stirring maintained until a clear solution of diazonium has resulted. The diazonium solution is then added slowly to the solution of dicarboxy-disulpho-benzidine-tetra-sodium salt prepared by dissolving 237 parts in 2,000 parts of water and neutralizing with sodium carbonate until neutral to blue litmus, adding 200 lbs. of sodium acetate. After all diazonium has been added, the reaction mass is neutralized with sodium carbonate solution until a test is obtained on brilliant yellow paper. The greenish yellow precipitate of the bis-diazo body is filtered, pressed well, and dried.

Example III 223 parts of benzidine-disulfo-sulfon are dissolved in 2500 parts of water and neutralized with sodium carbonate to blue litmus paper. 200 parts of sodium carbonate are added in excess. To this solution is added slowly and with good stirring the clear diazo solution of 5-nitro-2-amino-anisole prepared as follows:

168 parts of 5-nitro 2-amino-anisole are dissolved in 700 parts of water and 350 parts of muriatic acid 20° Bé. at 90° C., and added in a small stream with constant stirring to 1500 parts of crushed ice. The fine paste is diazotized by dumping a solution of 70 parts sodium nitrite in 250 parts of water and stirring until a clear solution results. The solution is filtered if not clear. The bis-diazo-amino compound is precipitated by the addition of salt after the reaction has been completed and a test with an alkaline solution of 1-amino-8-naphthol-3-6-disulphonic acid shows no presence of diazonium. The brownish precipitate is filtered, pressed well, and dried.

The bis-diazo-amino body whose probable formula is:

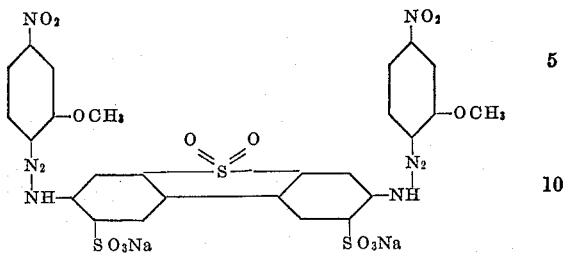

It yields bluish Bordeaux shades when mixed with beta-hydroxy acid arylides and applied on the fibre and subjected to acids. With alkali-metal-hydroxides it forms deep magenta colored solutions of the bis sodium salts of the bis-diazo-amino body, which is extremely soluble in water.

Example IV 250 parts of bis 4-4'-dicarboxy-3-3'-diamino-benzol-sulfon of ethylene-diamine

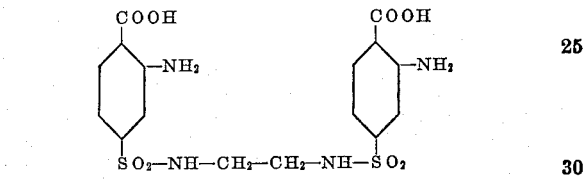

prepared by treating o-nitro-toluene with chlorsulfonic acid, condensing the sulfon-chloride with ethylene-diamine, oxidation of the methyl groups to the carboxylic groups, and subsequent reduction of the nitro to amino groups.

It is dissolved in 3000 parts of water and sufficient sodium carbonate to render the solution neutral to blue litmus paper. 200 parts of crystalline sodium acetate are added and the whole iced to below 10° C. The clear tetrazonium of 2-2'-dinitro-benzidine prepared by the nitration of benzidine sulfate in sulfuric acid with potassium nitrate is added in small portions and with good stirring.

The tetrazonium is prepared as follows:

137 parts of 2-2'-dinitro-benzidine are dissolved in 4000 parts of water and 300 parts of muriatic acid with the aid of heat. The solution is iced to 5° C., and a solution of 70 parts sodium nitrite in 300 parts of water are added. The tetrazonium is formed readily and the resulting clear solution is treated with a concentrated solution of sodium acetate until a test on Congo red paper no longer shows blue, indicating that all mineral acid has been destroyed.

The bis-diazo-amino body precipitates as the condensation proceeds. When all has reacted, the mass is neutralized with sodium carbonate solution until a definite alkaline test is obtained. The brown precipitate is filtered, pressed well, and dried. Its probable formula is:

This yields violet to purple shades with naphthol compounds.

The following is given as an example of producing a color effect upon textile fabrics with one of the compounds of our invention, similar processes being employed for other compounds included within our invention:

100 parts of a solution composed of approximately molecular amounts of the ortho toluidid of the beta hydroxy naphthoic acid, bis-5-nitro-2-diazo amino toluene 4-4', 3-3'-dicarboxy 6-6'-disulfo benzidine and sufficient sodium hydroxide in excess of the amount needed to form all sodium salt formation, and a solvent such as alcohol or of the glycol series is thickened with 900 parts starch-tragacanth paste. This paste is applied to the cloth by means of a printing press of the type used in the textile trade and the printed goods treated in an ager with acetic-formic acid vapor for a short period.

The material is then soaped, rinsed, and dried in the manner well known. The resultant Bordeaux shade is of a bright bluish hue, extremely fast to light, washing, and chlorine.

Among the other aromatic amines, the azotized compounds of which are suitable for the production of the compounds of our invention, are:

Nitro-anilines, nitro-toluidines, nitro-anisidines, nitro-phenetidines, nitro-xylidines, dichlor-anilines, dichlor-toluidines, trichlor-anilines, nitro-chlor-anilines, toluidines, anisidines, dinitro-anilines, toluidines, chloranilines, chlor-toluidines, chlor-anisidines, phenetidines, amino-diphenyl-ether, 2.5-dichlor-1-amino-benzene, 4-chlor-2-amino-1-methoxy-benzene, 4-chlor-2-amino-1-methylbenzene, 4.5-dichloro-2-amino-1-methyl-benzene, 5-nitro-2-amino-1-methyl-benzene, 4-chlor-2-amino-1-methyl-benzene, 2.5-dichlor-1-aminobenzene, 2.5-dichlor-4-amino-1-methyl-benzene, 4-chlor-2-amino-1-methylbenzene, 4-nitro-2-amino-1-methoxy-benzene, 5-nitro-2-amino-1-methoxybenzene, 3-amino-4-methoxy-6-nitro-1-methyl-benzene, 6-amino-4-benzoyl-amino-1.3-dimethoxydiphenyl, 3-amino-4-methoxy-6-benzoyl-amino-1-methylbenzene, 6-amino-3-benzoylamino-4-ethoxy-1-methoxybenzene, 4-nitro-4'-amino-2'.5'-dimethoxyazo-benzene, alpha-naphthylamine, chlor-alpha-naphthylamine, beta-naphthylamine, nitronaphthyamine, and amino anthraquinone.

Among the other diaryl compounds suitable for the production of the compounds of our invention are:

Disulpho-dicarboxy-diphenyl-ether

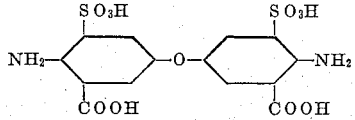

Disulpho-dicarboxy-stilbene

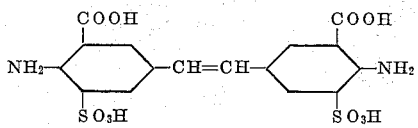

3-3'-disulpho-6-6'-dicarboxy-benzidine

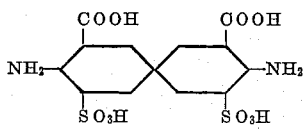

Among the coupling components suitable for use in the processes of our invention are the following:

Diacetoacetyl-o-tolidide, 2-hydroxy-naphthalene-3-carboxylic acid-o-toluidide, sodium compound of 2-hydroxy-naphthalene-carboxylic acid-o-phenetidide, 2-hydroxy-naphthalene-3-carboxylic acid-o-anisidide, 2-hydroxy-naphthalene-3-carboxylic acid -2- methyl -4'- methoxy-anilide, sodium compound of 2-hydroxy-naphthalene-3-carboxylic acid-o-toluidide, 2-hydroxy-naphthalene-3-carboxylic acid-alpha-naphthylamide, 2-hydroxynaphthalene-3-carboxylic acid-2'5'-dimethoxyanilide, sodium compound of 2-hydroxynaphthalene-3-carboxylic acid-anilide, sodium compound of 2-hydroxycarbazole-o-carboxylic acid-2'-toluidide, phenyl-methyl-pyrazolon, barbituric acid, and ethylacetoacetate.

We do not limit ourselves to the materials, quantities, times, temperatures, and steps of procedure specifically set forth as these are given solely for the purpose of clearly defining our invention.

What we claim is:

1. A compound formed by condensing a diazotized compound of the group consisting of aromatic monamines and aromatic diamines with a disulfo-dicarboxy-primary-diamine of the benzene series, the azo group entering the amido group of the disulfo-dicarboxy-primary-diamine, which compounds split up by the addition of acid into the diazo compound of the original diazotized compound and the original disulfo-dicarboxy-diamine.

2. A compound formed by condensing a diazotized compound of an aromatic monamine with a disulfo-dicarboxy-primary-diamine of the benzene series, the azo group entering the amido group of the disulfo-dicarboxy-primary-diamine, which compounds split up by the addition of acid into the diazo compound of the original diazotized compound and the original disulfo-dicarboxy-diamine.

3. A compound formed by condensing a diazotized compound of an aromatic diamine with a disulfo-dicarboxy-primary-diamine of the benzene series, the azo group entering the amido group of the disulfo-dicarboxy-primary-diamine, which compounds split up by the addition of acid into the diazo compound of the original diazotized compound and the original disulfo-dicarboxy-diamine.

4. A compound formed by condensing the diazotized compound of 5-nitro-2-amino-toluene with a disulfo-dicarboxy-primary-diamine of the benzene series, the azo group entering the amido group of the disulfo-dicarboxy-primary-diamine, which compound splits up by the addition of acid into the diazotized compound of 5-nitro-2-amino-toluene and the original disulfo-dicarboxy-diamine.

5. A compound formed by condensing a tetrazotized benzidine with a disulfo-dicarboxy-primary-diamine of the benzene series, the azo group entering the amido group of the disulfo-dicarboxy-primary-diamine, which compound splits up by the addition of acid into the original diazotized benzidine and the original disulfo-dicarboxy compound.

6. A compound having the formula

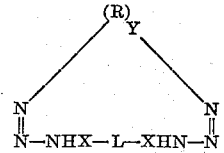

in which R is the radical of a diazotized member of the group consisting of aromatic monamines and aromatic diamines; X—L—X is a diaryl radical in which X is an aryl group and L is a member of the group consisting of oxygen, sulphur,

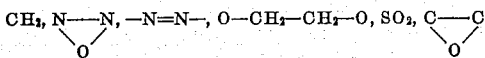

a diphenyl linkage, and of such character that it is not disassociated when the diaryl compound is coupled with the azotized aromatic amine, each aryl group containing at least one solubilizing group consisting of sulfo and carboxy and which is unsubstituted or substituted by a member of the group consisting of nitro, hyroxy, alkyl, and alkoxy; the N=N group being combined directly with the N atom of the amino group of the diaryl compound; in which Y is 2 when R is the residue of two diazotized monoamines and 1 when R is the residue of a tretrazotized aromatic diamine.

7. A compound having the formula

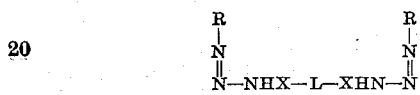

in which R is the radical of a diazotized member of the group consisting of aromatic monamines; X—L—X is a diaryl radical in which X is an aryl group and L is a member of the group consisting of oxygen, sulfo,

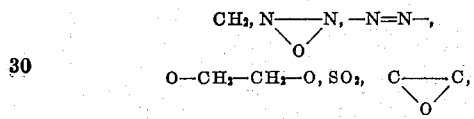

a diphenyl linkage, and of such character that it is not disassociated when the diaryl compound is coupled with the diazotized amine, each aryl group containing at least one solubilizing group consisting of sulfo and carboxy and which is unsubsttiuted or substituted by a member of the group consisting of nitro, hydroxy, alkyl, and alkoxy; and the N=N groups being combined directly with the N atom of the amino groups of the diaryl compound.

8. A compound having the formula

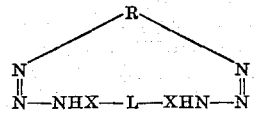

in which R is the radical of a diazotized member of the group consisting of aromatic diamines; X—L—X is a diaryl radical in which X is an aryl group and L is a member of the group consisting of oxygen, sulfo,

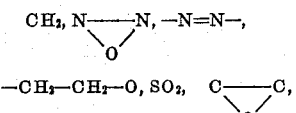

a diphenyl linkage and of such character that it is not disassociated when the diaryl compound is coupled with the diazotized amine, each aryl group containing at least one solubilizing group consisting of sulfo and carboxy and which is unsubstituted or substituted by a member of the group consisting of nitro, hydroxy, alkyl, and alkoxy; and the N=N groups being combined directly with the N atom of the amino groups of the diaryl compound.

9. Compounds of the formula

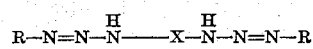

in which X represents a diphenyl nucleus containing solubilizing groups attached to each benzene ring, and R represents the residue of a diazotized aromatic amine.

EUGENE A. MARKUSH.
JULIUS MILLER.